United States Patent
Schwerman

(10) Patent No.: US 6,177,764 B1
(45) Date of Patent: *Jan. 23, 2001

(54) METHODS AND APPARATUS FOR THE CLOSED LOOP CONTROL OF MAGNETRON CURRENT

(75) Inventor: Paul William Schwerman, Phoenix, AZ (US)

(73) Assignee: Honeywell International Inc., Morristown, NJ (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/731,447

(22) Filed: Oct. 15, 1996

(51) Int. Cl.[7] .................................................. H01J 25/50
(52) U.S. Cl. ........................................ 315/39.51; 315/307
(58) Field of Search ............................ 315/39.51–39.77, 315/307; 331/86, 87, 172–173; 332/106

(56) References Cited

U.S. PATENT DOCUMENTS 2,694,149 * 11/1954 Gross ...................................... 331/87
3,973,145   8/1976  Schmitt et al. .
4,755,740   7/1988  Loucks .

FOREIGN PATENT DOCUMENTS

| 0364040 | 10/1989 | (EP) . |
| 0517226 | 6/1992 | (EP) . |
| 1421195 | 1/1973 | (GB) . |
| 2108734 | 10/1982 | (GB) . |
| 2213613 | 12/1988 | (GB) . |
| 2216688 | 3/1989 | (GB) . |
| 2239330 | 11/1990 | (GB) . |

* cited by examiner

Primary Examiner—David Mis

(57) ABSTRACT

A fault-tolerant control system facilitates the closed loop control of a magnetron. The control system includes a transformer assembly for applying peak current to a magnetron, a pulse-forming network that conditions a transmit pulse, and a control circuit for adjusting the peak current applied to the magnetron. The control circuit includes a sample and hold circuit for comparing a signal representative of a detected peak current to a desired peak current level. The sample and hold circuit is coupled to a digital up/down counter circuit, and the output of the counter circuit is utilized to adjust the charge voltage of the pulse-forming network.

5 Claims, 4 Drawing Sheets

METHODS AND APPARATUS FOR THE CLOSED LOOP CONTROL OF MAGNETRON CURRENT

BACKGROUND OF THE INVENTION

1. Field of the Invention

The present invention relates, generally, to a technique for controlling the RF output of a magnetron of a type employing a pulse-forming network to generate output pulses and, more particularly, to a closed-loop control system for controlling peak current through the magnetron using a peak current sense in a feedback loop.

2. Description of the Related Art

The use of magnetrons in radar systems is generally well known. Such radar systems are extensively used in military applications for detecting aircraft, projectiles, and the like. Magnetron-based radar systems are also routinely employed in weather systems to detect rain clouds, turbulence, and the like.

Presently known magnetrons typically comprise a diode encased in a vacuum tube. The diode essentially comprises a cathode and an anode, wherein a current source is fed to the cathode plate by a compatible current source. A pulse-forming network (PFN) may be utilized to condition a transmit pulse produced by the magnetron.

A PFN typically includes a group of coupled inductors and individual capacitors whose characteristic impedance is approximately matched to the static impedance of the magnetron. The resonant frequency of each LC section in the pulse-forming network and the number of such LC sections determine the pulse width of the RF pulse emitted by the magnetron. As a general rule, the ripple associated with the output pulse may be minimized and the squareness of the pulse enhanced by adding a larger number of LC sections to the PFN.

It is known that magnetron performance drifts as the magnetron ages. This is believed to be due in part to changes in the static and dynamic impedance of the magnetron with age. In addition temperature and other environmental factors can influence the performance of a magnetron. Attempts to control magnetron operation within its optimum operating range have met with limited success. This is due in part to the fact that although it may be possible to control magnetron voltage, the sensitivity of the magnetron output power to the magnetron voltage may be undesirably low. Although the magnetron output power is relatively sensitive to changes in the magnetron current, control of magnetron current has been difficult to achieve in prior art systems.

One known method for controlling magnetron current is to monitor magnetron power output and to manually adjust the magnetron current in the factory or a service center. Unfortunately, this process is time consuming, cumbersome, and expensive to perform.

Accordingly, a need exists for a magnetron current control configuration that overcomes the shortcomings of the prior art.

SUMMARY OF THE INVENTION

A control system is provided which maintains peak magnetron current at a desired predetermined level during the life of a magnetron.

In accordance with a preferred embodiment of the present invention, a closed-loop current control circuit is employed to monitor peak magnetron current, and to adjust PFN charge voltage to thereby control the peak current applied to the magnetron.

In accordance with one aspect of the present invention, a transformer assembly is employed in conjunction with a PFN to apply a peak current to the magnetron. The transformer assembly includes a current transformer configured to sample the peak current. The sampled peak current is applied to a sample and hold circuit that compares the measured peak current to a predetermined desired peak current. If the sampled peak current is higher or lower than the desired peak current, the charge voltage applied to the PFN is appropriately trimmed to thereby drive the peak current actually applied to the magnetron to the desired peak current.

In accordance with a further aspect of the present invention, a digital control circuit employs an up-down counter to incrementally increase or decrease the PFN charge voltage when the detected peak current is either too high or too low. By employing an up-down counter in this manner, the maximum change in PFN charge voltage may be limited to a predetermined range, e.g., a voltage change associated with one bit of resolution, during each correction cycle.

In accordance with a particularly preferred embodiment, the output of the up-down counter may be applied to a digital-to-analog converter (DAC), with the output of the DAC being applied to a PFN voltage trim circuit.

In accordance with an alternate embodiment of the present invention, an analog control scheme may be employed to adjust PFN charge voltage in response to the sampled peak current. In accordance with this alternate embodiment, the sampled peak current is compared to the desired peak current to produce a signal that is applied to the input of an integrator circuit. When the difference between the desired peak current and actual peak current exceeds a predetermined threshold, the integrator circuit is configured to apply an analog correction signal to the PFN charge circuit to adjust the PFN voltage and thereby drive the actual peak current to the desired level.

In accordance with a preferred aspect of the present invention, the control circuit operates with a dead band such that the PFN charge voltage is adjusted only when the sampled peak current differs from the desired peak current by a predetermined threshold amount.

BRIEF DESCRIPTION OF THE DRAWINGS

The present invention will hereinafter be described in conjunction with the appended drawing figures, wherein like numerals denote like elements and.

DETAILED DESCRIPTION OF EXEMPLARY EMBODIMENTS

Figure 1:
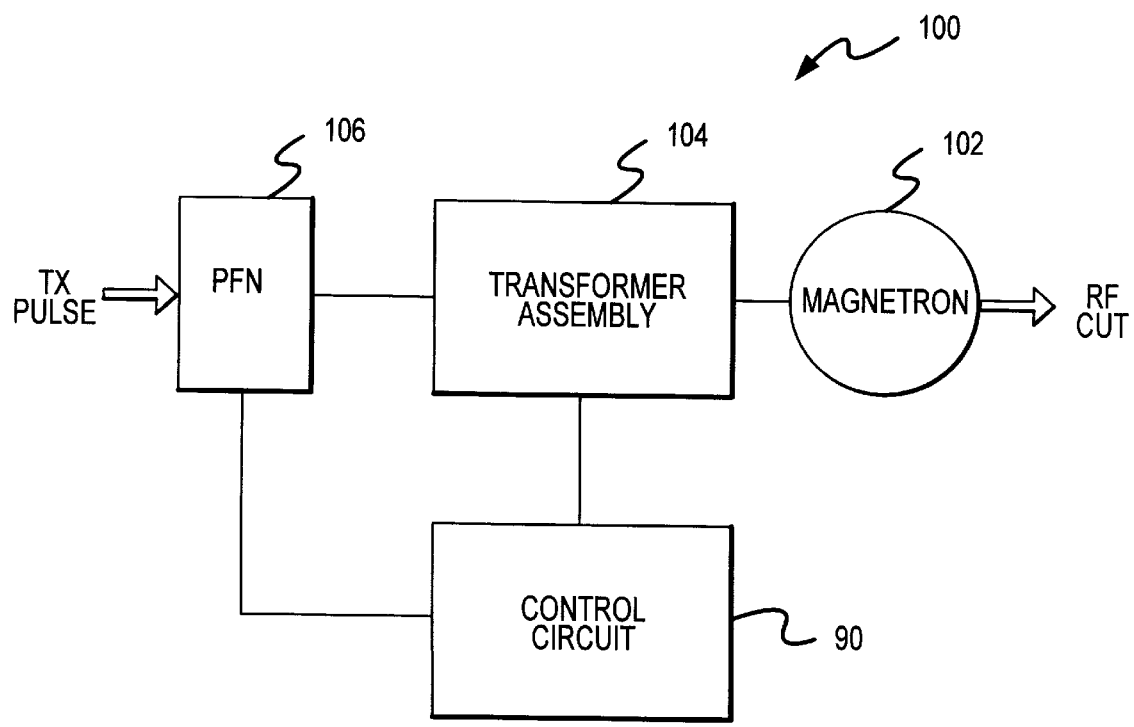
FIG. 1 is a general schematic block diagram of an exemplary control circuit configured in accordance with the present invention.

The load that a magnetron presents to its modulator may be modeled as a zener diode. In particular, a typical magnetron draws capacitive current up to a certain voltage and thereafter presents a dynamic load impedance to the modulator. Optimum magnetron performance requires that the current through the magnetron be closely trimmed to the desired operating point, for example in the range of 5%. FIG. 1 is a general block diagram representation of a control system 100 configured to control the magnetron current applied to a magnetron 102. Control system 100 may be utilized to control the RF output of magnetron 102 at a suitable level. Control system 100 generally includes a control circuit 90 coupled between a transformer assembly 104 and a pulse forming network (PFN) 106. Magnetron 102 receives a drive current from transformer assembly 104 in a manner known to those skilled in the art.

Control circuit 90 is adapted to monitor an electrical parameter (e.g., magnetron current) of transformer assembly 104 and adjust an electrical parameter (e.g., PFN charge voltage) according to a specified control algorithm. The control algorithm may, for example, utilize a simple threshold comparison, as described further below. Those skilled in the art will appreciate that control system 100 may detect, monitor, or adjust alternate electrical parameters as necessary for the desired application.

Figure 2:
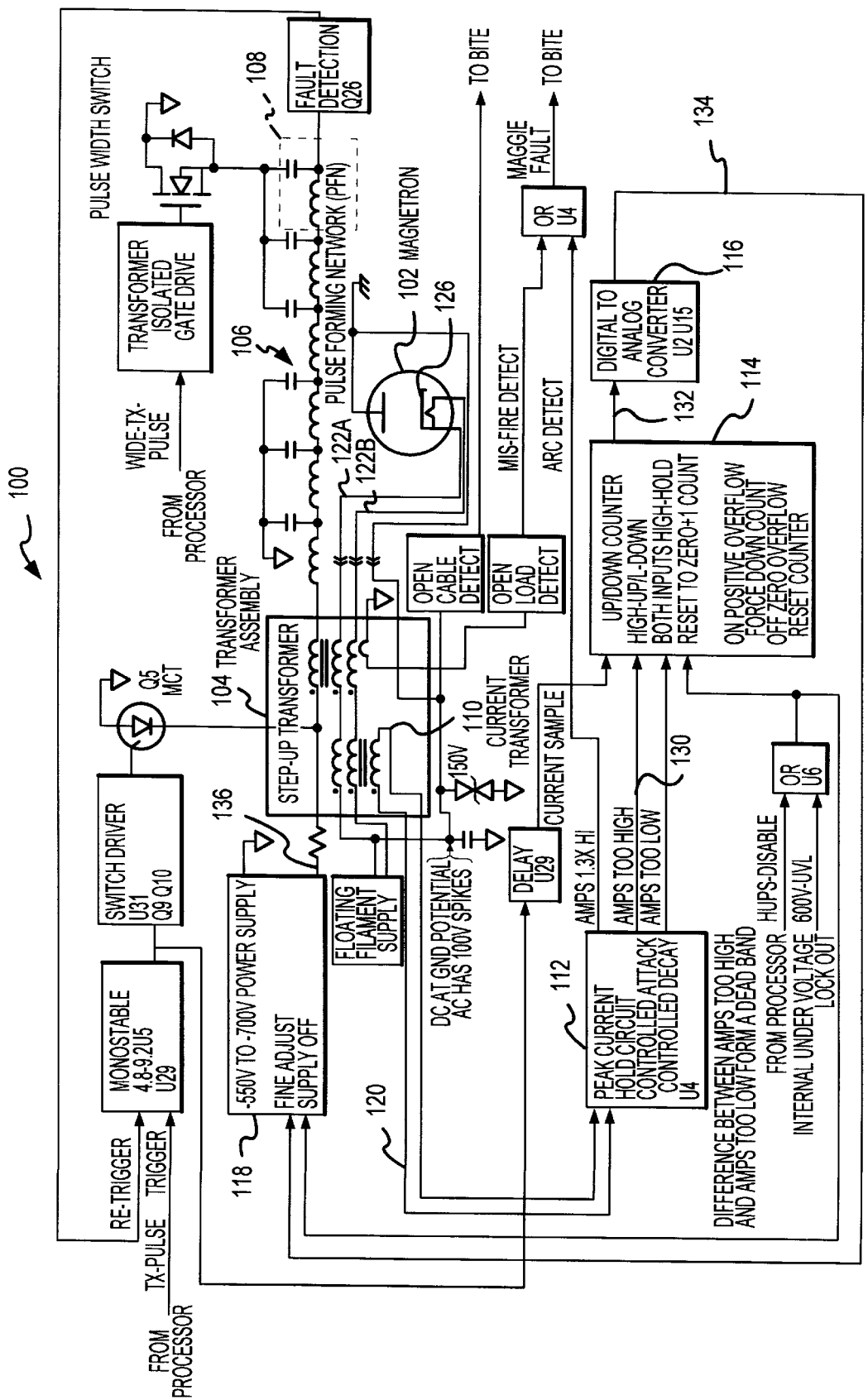
FIG. 2 is a detailed schematic block diagram of an exemplary control circuit including a transformer assembly, a PFN network, a magnetron, a sample and hold circuit, an up-down counter, a DAC, and a PFN charge trim circuit.

Referring now to FIG. 2, PFN 106 preferably includes a plurality of linked LC sections 108, the number of which may be selected according to the specific application. Transformer assembly 104 may include a current transformer 110 adapted to detect the magnetron current applied to magnetron 102. Control circuit 90 (see FIG. 1) preferably includes at least a sample and hold circuit 112, an up-down counter 114, a DAC 116, and a PFN charge voltage adjustment circuit 118.

Transformer assembly 104 suitably comprises any desired transformer capable of applying peak current to magnetron 102, for example, a Model No. 7021863-2, manufactured by Payne Magnetics. Magnetron 102 suitably comprises a Model No. MG 5431, manufactured by EEV Limited.

Pulse forming network 106 is suitably configured to accumulate charges of a predetermined amplitude and pulse width to permit transformer assembly 104 to apply a predetermined pulse profile to magnetron 102 via, e.g., respective leads 122A and 122B applied to a cathode 126 of magnetron 102. In this regard, a typical RF pulse profile designed to detect clouds, rainfall, or the like, may comprise a 180 hertz signal which exhibits the following pulse pattern: a 1 or 2 microsecond RF pulse, followed by a 4 millisecond delay, repeated three times, with each three pulse cycle being separated by 8 milliseconds. Those skilled in the art will appreciate that the inductance and capacitance values associated with respective LC sections 108 may be designed to produce virtually any desired pulse profile and pulse width.

With continued reference to FIG. 2, current transformer 110 is suitably configured to detect peak current generated by transformer assembly 104 and applied to magnetron 102 via leads 122A and 122B. Transformer 110 applies the sampled peak current to sample and hold circuit 112 through any convenient mechanism; in the illustrated embodiment, the sampled peak current is applied to sample and hold circuit 112 through lead lines 120.

Sample and hold circuit 112 suitably includes comparator circuitry (discussed in greater detail below in conjunction with FIG. 3), to thereby generate an output signal 130 applied to up-down counter 114. Up-down counter 114 is suitably configured to limit the magnitude of the change in peak current to within a predetermined level during a correction cycle. Up-down counter 114 is configured to apply a correction signal 132 to DAC 116, which converts the correction signal to an analog output 134. Analog output 134 is applied to PFN charge voltage adjustment circuit 118.

Up-down counter 114 suitably comprises any convenient counter circuit, for example, a Part No. 74HC191, manufactured by Harris. DAC 116 may comprise any suitable digital-to-analog converter, for example Part No. DAC08, manufactured by Motorola.

Output signal 134 generated by DAC 116 is suitably an analog PFN voltage trim signal configured to conveniently adjust PFN charge voltage trim circuit 118. In response to output signal 134, charge trim circuit 118 suitably generates an adjustment signal 136 that effectively controls the magnitude of the signal generated by PFN 106. In so doing, the peak current applied by transformer assembly 104 to magnetron 102 is driven to the desired peak current level for magnetron 102.

In a preferred embodiment, the variation in correction signal 132 is constrained to within a fairly narrow range for each calculation cycle, e.g., within a 1 to 8 bit resolution, to thereby minimize undesired overshooting, undershooting, and hunting when driving the actual peak current signal to the desired peak current signal. This exemplary resolution may correspond to approximately 216 volts out of a 667 volt range of PFN 106. In a particularly preferred embodiment, up-down counter 114 is configured to effect a maximum change in the voltage on PFN 106, e.g., approximately 0.84 volts per calculation cycle.

Figure 3A:
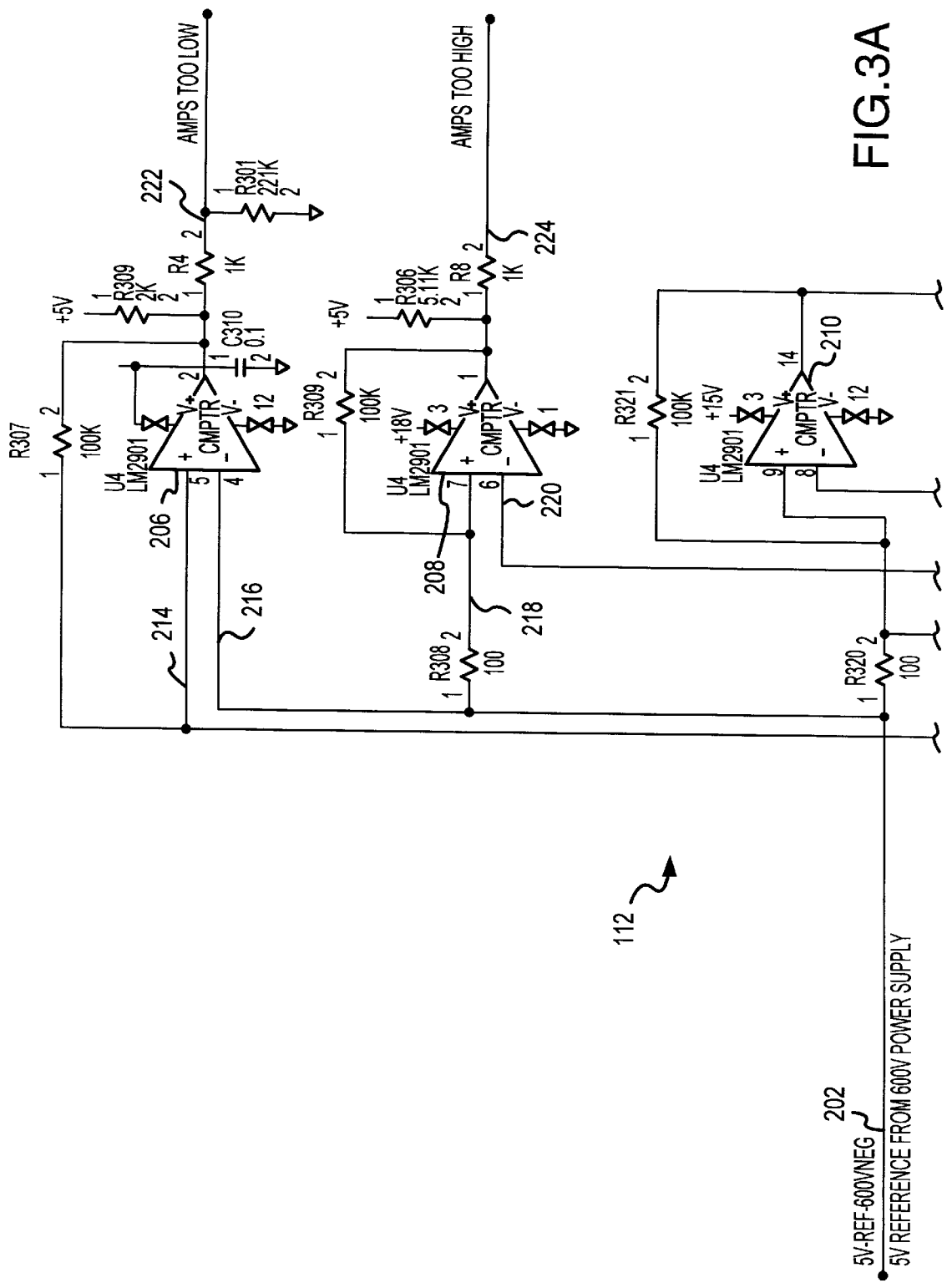
FIGS. 3A and 3B are schematic diagrams that together make up an exemplary sample and hold circuit shown in FIG. 2.
Figure 3B:
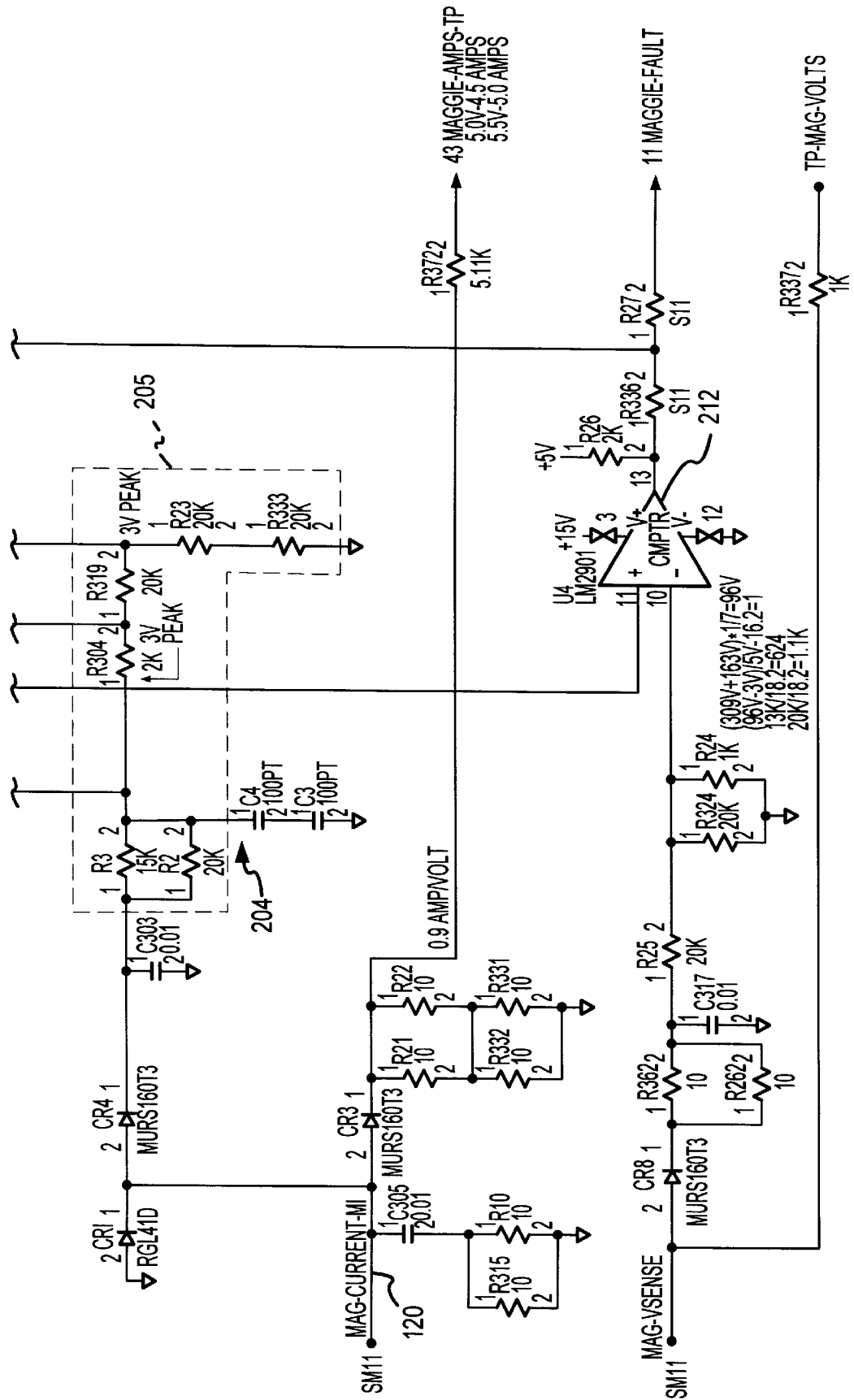

Referring now to FIGS. 3A and 3B, sample and hold circuit 112 suitably comprises current sense lead 120 which applies the peak current sensed from current transformer 110 to sample and hold circuit 112. Sample and hold circuit 112 employs a reference voltage carried on lead line 202 and a voltage divider 205. In a preferred embodiment, the magnitude of the current signal at an input to voltage divider 205 is preset during the manufacture of control system 100 to reflect the optimum operating range of magnetron 102. By controlling the actual peak current applied to magnetron 102 by leads 122A and 122B (as discussed in greater detail below), magnetron 102 preferably operates at its optimum set point throughout its operational life. Accordingly, magnetron 102 need not be manually adjusted to account for changes in its dynamic impedance caused by fluctuations in temperature, age, or the like.

With continued reference to FIGS. 3A and 3B, sample and hold circuit 112 further comprises various noise control circuitry, including respective noise control capacitors 204. Sample and hold circuit 112 further includes respective comparators 206, 208, 210, and 212, which suitably may be implemented using a Part No. LM2901 comparator circuit manufactured by Motorola. Respective comparators 212 and 210 are configured to detect an open circuit condition and a short circuit condition, respectively, at magnetron 102. With momentary reference to FIG. 2, up-down counter 114 may suitably be configured to generate an appropriate output signal in response to the detection of an open or short circuit condition. In accordance with one embodiment of the present invention, up-down counter 114 may be configured to increase or decrease output correction signal 132, for example by one bit, thus treating the open and short circuit conditions in substantially the same way as any other operating condition. Alternatively, up-down counter 114 may be configured to effectively ignore the short and open circuit conditions by generating and/or maintaining a null output signal to thereby filter open and short circuit conditions from the closed-loop control circuit.

Comparator 206 is suitably configured to incorporate a dead band operating range into the control circuit. More particularly, first input 214 of comparator 206 generally corresponds to a filtered sampled current level, and a second input 216 to comparator 206 generally corresponds to the desired minimum peak current level. To incorporate a dead band, the various capacitors and resistors which comprise the feedback loop associated with comparator 206 may suitably be selected such that comparator 206 generates an output signal 222 only when the difference between the sensed peak current and the desired minimum peak current exceeds a threshold delta. No adjustments are made when the sampled peak current is within a predetermined delta from the desired minimum peak current, and the peak current applied to magnetron 102 is simply allowed to operate within the dead band. If, on the other hand, the sensed peak current deviates from the desired minimum peak current by an amount outside the dead band range, comparator 208 suitably generates an output signal 224 (corresponding to correction signal 130 in FIG. 2) to adjust the PFN charge voltage, as described above.

With continued reference to FIG. 3, comparator 208 is suitably configured to compare the sample peak current to the desired maximum peak current, and to adjust the PFN charge voltage as necessary to drive the difference between the actual and desired peak current to a minimum value, for example zero. In this regard, it should be noted that sample circuit 112 may be employed with or without a dead band; that is, if no dead band is desired, comparator 206 may simply be disabled.

A first input 218 to comparator 208 generally corresponds to the desired current level from lead line 202. A second input 220 to comparator 208 generally corresponds to the sampled peak current level from lead line 120. Comparator 208 compares the sensed peak current from the desired peak current and generates an output signal 224 indicative of the difference between the actual and desired peak current values. Output signal 224 corresponds to output signal 130 shown in FIG. 2.

With continued reference to FIGS. 2, 3A and 3B, output signal 224 of comparator 208 (generally corresponding to output signal 130 from sample circuit 112) is applied to up-down counter circuit 114. In response to output signal 130, up-down counter circuit 114 is either increased by 1 bit (if the sampled peak current is less than the desired peak current), decreased by 1 bit (if the sampled current is greater than the desired peak current), or remains unchanged (if the sampled peak current is within a desired dead band operating range).

As discussed above, although a 1 bit change is employed in the preferred embodiment described herein, virtually any desired resolution per correction cycle may be employed to suit the needs of the specific application.

DAC 116 converts the digital input conveyed by correction signal 132 into an analog output signal 134. Analog output signal 134 is employed to adjust PFN charge voltage circuit 118 in accordance with the difference between the sampled peak current and the desired peak current.

The digital embodiment described above is preferable in applications where the duty factor of the transmit pulse may be susceptible to variations. The digital control scheme is relatively immune to changes in the transmit pulse duty factor, i.e., the magnetron current may be effectively regulated such that the magnetron output power remains substantially consistent during operation.

In accordance with an alternate embodiment of the present invention, control circuit 90 (see FIG. 1) may employ an analog control scheme rather than the digital control scheme described above. In particular, up-down counter 114 and DAC 116 may suitably be replaced with an integrator circuit, for example one employing a conventional operational amplifier in conjunction with a suitably sized capacitor (not shown). In the analog embodiment, the voltage present at first input 214 from sample and hold circuit 112 becomes the integrator input by virtue of component value changes, and an output signal generated by the integrator is applied directly to PFN charge voltage circuit 118.

While the above description of the analog embodiment may be preferred for some applications, those skilled in the art should recognize that certain other applications may benefit from an alternate configuration. Accordingly, rather than applying sampled peak current signals to the integrator, the average current applied to magnetron 102 may be applied directly to the integrator, such that when the average magnetron current exceeds the desired magnetron current by a predetermined amount, the integrator applies an analog correction signal to adjustment circuit 118 to thereby drive the difference between the average actual magnetron current and the desired magnetron current to a minimum, for example zero. Due to the fixed ration between the peak and the average magnetron currents, the peak current may be controlled by suitably adjusting the average current.

In summary, the present invention provides an improved control system for regulating peak magnetron current at a desired level during the life of a magnetron. The control system compensates for variations in the static and dynamic impedance of the magnetron to facilitate a relatively stable RF output over time. The control system eliminates the need for manual adjustments and periodic maintenance associated with conventional magnetrons.

The present invention has been described above with reference to preferred embodiments. However, those skilled in the art will recognize that changes and modifications may be made to the preferred embodiments without departing from the scope of the present invention. For example, the present invention is not limited to the specific hardware implementations described herein. In addition, any control signal representing a suitable electrical parameter or magnetron characteristic may be utilized as a control signal by the present invention. These and other changes and modifications are intended to be included within the scope of the present invention, as set forth in the following claims.

What is claimed is:

1. A control system for regulating output of a magnetron, said control system comprising:

means for detecting a drive parameter associated with the output level of said magnetron;

a control circuit coupled to said means for detecting and configured to produce a control signal in response to said drive parameter; said control circuit including a comparator circuit for comparing an input representative of said drive parameter to a threshold level and a means for adjusting the level of said control signal in a first sense when said input is greater than said threshold level and for adjusting the level of said control signal in a second sense when said input is less that said threshold level; said means for adjusting including a digital up-down counter and said control signal comprising a digital signal; and an adjustment circuit coupled to said control circuit, said adjustment circuit being configured to cause variation in said drive parameter in response to said control signal.

2. A control system according to claim 1, wherein said control circuit periodically samples said drive parameter and wherein said control circuit is further configured to be substantially immune to variations in said drive parameter.

3. A control system according to claim 1, wherein said drive parameter is periodically sampled by said control circuit and said control system further comprises means for storing the level of said control signal between samples of said drive parameter.

4. A control system according to claim 1, wherein said means for adjusting is configured to adjust the level of said control signal when said control signal differs from said threshold level by a predetermined amount and said means for adjusting is configured to maintain the level of said control signal when said control signal differs from said threshold level by less than said predetermined amount.

5. A control system according to claim 1 wherein said control circuit periodically samples said drive parameter and wherein said control circuit is further configured to be substantially immune to faults in said drive parameter.

* * * * *